(12) United States Patent
Pham et al.

(10) Patent No.: US 9,544,949 B2
(45) Date of Patent: Jan. 10, 2017

(54) BOAT AND COIL DESIGNS

(75) Inventors: Quoc Tran Pham, Anaheim, CA (US); Michael Deming, Trabuco Canyon, CA (US); Theodore A. Waniuk, Lake Forest, CA (US); Sean Timothy O'Keeffe, Tustin, CA (US); Joseph Stevick, Olympia, WA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/373,587

(22) PCT Filed: Jan. 23, 2012

(86) PCT No.: PCT/US2012/022227
§ 371 (c)(1),
(2), (4) Date: Jul. 21, 2014

(87) PCT Pub. No.: WO2013/112130
PCT Pub. Date: Aug. 1, 2013

(65) Prior Publication Data
US 2014/0369375 A1    Dec. 18, 2014

(51) Int. Cl.
*H05B 6/22* (2006.01)
*F27D 3/00* (2006.01)
(Continued)

(52) U.S. Cl.
CPC .......... *H05B 6/24* (2013.01); *B22D 1/00* (2013.01); *B22D 17/007* (2013.01);
(Continued)

(58) Field of Classification Search
CPC ....... B22D 41/01; B22D 1/00; B22D 17/2023; B22D 17/2038; B22D 17/2053; B22D 17/007; B22D 25/06; B22D 27/15; F27B 14/20; F27B 14/063; F27B 14/061; F27B 14/15; H05B 6/367; H05B 6/24; H05B 6/36; H05B 6/26; H05B 6/20
(Continued)

(56) References Cited

U.S. PATENT DOCUMENTS 3,331,909 A * 7/1967 Kasper .................. H05B 6/067
                                                        373/152
3,709,678 A * 1/1973 Helary et al. .................. 373/158
(Continued)

FOREIGN PATENT DOCUMENTS

JP    2002029727       1/2002
JP    2010-36210 A *   2/2010

OTHER PUBLICATIONS

International Search Report and Written Opinion, PCT/ISA/210, PCT/ISA/220, PCT/ISA/237, mail date Jan. 15, 2013.

*Primary Examiner* — Hung D Nguyen
(74) *Attorney, Agent, or Firm* — Brownstein Hyatt Farber Schreck, LLP

(57) ABSTRACT

Vessels used for melting material to be injection molded to form a part are described. One vessel has a body formed from a plurality of elongate segments configured to be electrically isolated from each other and with a melting portion for melting meltable material therein. Material can be provided between adjacent segments. An induction coil can be used to melt the material in the body. Other vessels have a body with an embedded induction coil therein. The embedded coil can be configured to surround the melting portion, or can be positioned below and/or adjacent the melting portion, so that meltable material is melted. The vessels can be used to melt amorphous alloys, for example.

18 Claims, 12 Drawing Sheets

(51) Int. Cl.
*H05B 6/24* (2006.01)
*B22D 41/01* (2006.01)
*F27B 14/06* (2006.01)
*H05B 6/36* (2006.01)
*B22D 1/00* (2006.01)
*B22D 17/00* (2006.01)
*B22D 17/20* (2006.01)
*B22D 25/06* (2006.01)
*B22D 27/15* (2006.01)
*B22D 41/015* (2006.01)

(52) U.S. Cl.
CPC ..... *B22D 17/2023* (2013.01); *B22D 17/2038* (2013.01); *B22D 17/2053* (2013.01); *B22D 25/06* (2013.01); *B22D 27/15* (2013.01); *B22D 41/01* (2013.01); *B22D 41/015* (2013.01); *F27B 14/063* (2013.01); *H05B 6/36* (2013.01); *H05B 6/367* (2013.01)

(58) Field of Classification Search
USPC ............... 373/138, 139, 142, 146, 151, 152, 153,373/154, 155, 156, 158, 144, 117, 118; 219/635, 638, 672, 673, 674, 675; 266/240, 266/242
See application file for complete search history.

(56) References Cited

U.S. PATENT DOCUMENTS

| | | | | |
|---|---|---|---|---|
| 3,725,629 A | * | 4/1973 | Vickers | 219/673 |
| 3,775,091 A | * | 11/1973 | Clites | C22B 4/00 |
| | | | | 373/155 |
| 4,138,096 A | * | 2/1979 | Boucher et al. | 266/240 |
| 4,738,713 A | | 4/1988 | Stickle et al. | |
| 5,109,389 A | * | 4/1992 | Stenzel | F27B 14/063 |
| | | | | 373/138 |
| 2003/0002559 A1 | * | 1/2003 | Fishman et al. | 373/146 |
| 2003/0213575 A1 | * | 11/2003 | Todaro et al. | 164/135 |
| 2006/0291529 A1 | * | 12/2006 | Haun et al. | 373/156 |

* cited by examiner

BOAT AND COIL DESIGNS

FIELD

The present disclosure is generally related to boats or vessels used for melting materials, including materials to be injected into a mold.

BACKGROUND

When melting materials in an injection molding system, uniform temperatures in ranges appropriate to the meltable material should be implemented and maintained in order to produce quality molded parts. Utilizing effective vessels during melting can improve such quality.

SUMMARY

A proposed solution according to embodiments herein for improving molded objects or parts is to use bulk-solidifying amorphous alloys.

One aspect of the disclosure provides a vessel for melting meltable material having a body with a melting portion configured to receive meltable material to be melted therein, the body having a plurality of elongate segments configured to be electrically isolated from each other.

Another aspect of the disclosure provides a vessel for melting meltable material having a body with a melting portion configured to receive meltable material to be melted therein and an induction coil embedded within the body configured to melt the meltable material received in the melting portion.

Other features and advantages of the present disclosure will become apparent from the following detailed description, the accompanying drawings, and the appended claims.

DETAILED DESCRIPTION

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to 10.1%, such as less than or equal to 10.05%.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties than their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in BMG parts, there is a need to develop methods for casting BMG parts having controlled amount of amorphicity.

Figure 1:
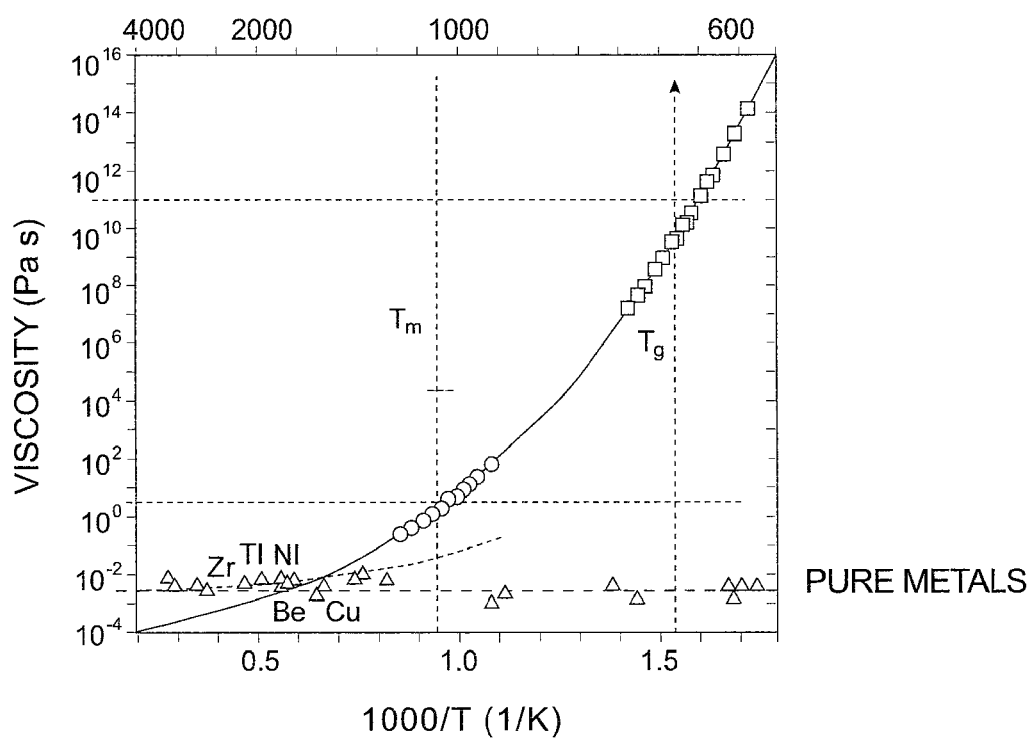
FIG. 1 provides a temperature-viscosity diagram of an exemplary bulk solidifying amorphous alloy.

FIG. 1 (obtained from U.S. Pat. No. 7,575,040) shows a viscosity-temperature graph of an exemplary bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 2:
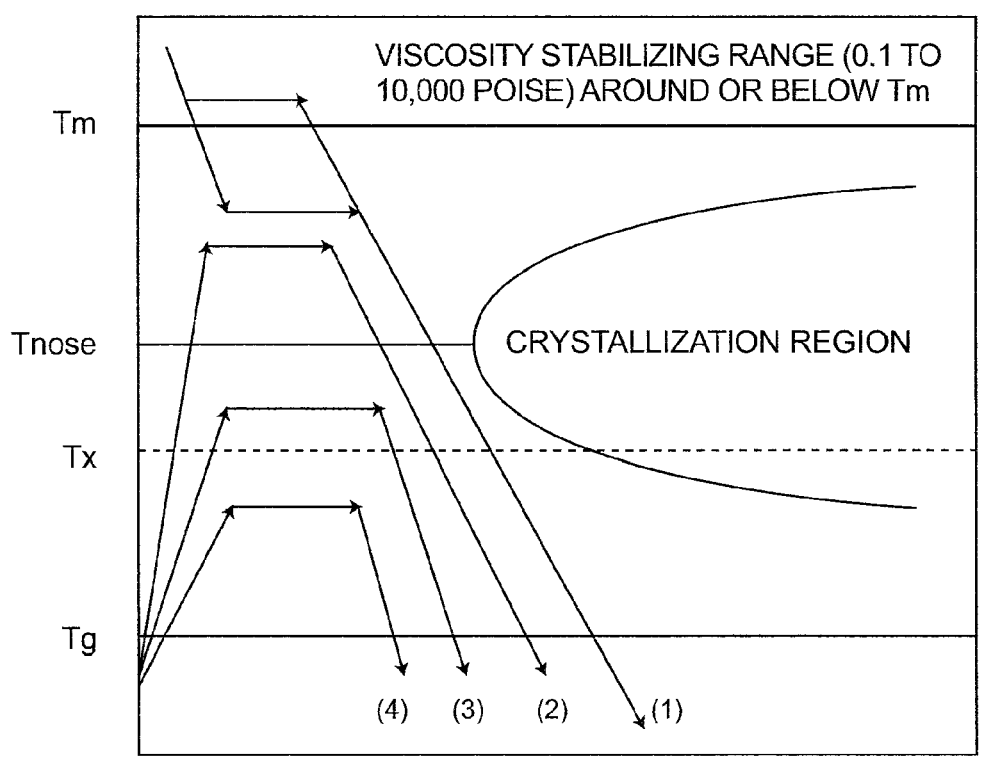
FIG. 2 provides a schematic of a time-temperature-transformation (TTT) diagram for an exemplary bulk solidifying amorphous alloy.

FIG. 2 (obtained from U.S. Pat. No. 7,575,040) shows the time-temperature-transformation (TTT) cooling curve of an exemplary bulk solidifying amorphous alloy, or TTT diagram. Bulk-solidifying amorphous metals do not experience a liquid/solid crystallization transformation upon cooling, as with conventional metals. Instead, the highly fluid, non crystalline form of the metal found at high temperatures (near a "melting temperature" Tm) becomes more viscous as the temperature is reduced (near to the glass transition temperature Tg), eventually taking on the outward physical properties of a conventional solid.

Even though there is no liquid/crystallization transformation for a bulk solidifying amorphous metal, a "melting temperature" Tm may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous metal for forming the BMG parts. Furthermore, the cooling rate of the molten metal to form a BMG part has to such that the time-temperature profile during cooling does not traverse through the nose-shaped region bounding the crystallized region in the TTT diagram of FIG. 2. In FIG. 2, Tnose is the critical crystallization temperature Tx where crystallization is most rapid and occurs in the shortest time scale.

The supercooled liquid region, the temperature region between Tg and Tx is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between $10^{12}$ Pa s at the glass transition temperature down to $10^5$ Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

One needs to clarify something about Tx. Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 1 (b), Tx is shown as a dashed line as Tx can vary from close to Tm to close to Tg.

The schematic TTT diagram of FIG. 2 shows processing methods of die casting from at or above Tm to below Tg without the time-temperature trajectory (shown as (1) as an example trajectory) hitting the TTT curve. During die casting, the forming takes place substantially simultaneously with fast cooling to avoid the trajectory hitting the TTT curve. The processing methods for superplastic forming (SPF) from at or below Tg to below Tm without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above Tnose or below Tnose, up to about Tm. If one heats up a piece of amorphous alloy but manages to avoid hitting the TTT curve, you have heated "between Tg and Tm", but one would have not reached Tx.

Typical differential scanning calorimeter (DSC) heating curves of bulk-solidifying amorphous alloys taken at a heating rate of 20 C/min describe, for the most part, a particular trajectory across the TTT data where one would likely see a Tg at a certain temperature, a Tx when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 2, then one could avoid the TTT curve entirely, and the DSC data would show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

Phase

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non-Metal

The term "metal" refers to an electropositive chemical element. The term "element" in this Specification refers generally to an element that can be found in a Periodic Table. Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

Depending on the application, any suitable nonmetal elements, or their combinations, can be used. The alloy (or "alloy composition") can comprise multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can comprise multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metallic matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function: $G(x, x') = \langle s(x), s(x') \rangle$.

In the above function, s is the spin quantum number and x is the distance function within the particular system. This function is equal to unity when $x=x'$ and decreases as the distance $|x-x'|$ increases. Typically, it decays exponentially to zero at large distances, and the system is considered to be disordered. If, however, the correlation function decays to a constant value at large $|x-x'|$, then the system can be said to possess long-range order. If it decays to zero as a power of the distance, then it can be called quasi-long-range order. Note that what constitutes a large value of $|x-x'|$ is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals present in the alloy. The fraction can refer to volume fraction or weight fraction, depending on the context. A measure of how "amorphous" an amorphous alloy is can be amorphicity. Amorphicity can be measured in terms of a degree of crystallinity. For example, in one embodiment, an alloy having a low degree of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals can be produced through a variety of quick-cooling methods. For instance, amorphous metals can be produced by sputtering molten metal onto a spinning metal disk. The rapid cooling, on the order of millions of degrees a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one modern amorphous metal, known as Vitreloy™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embitterment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sports equipment, medical devices, electronic components and equipment, and thin films. Thin films of amorphous metals can be deposited as protective coatings via a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically comprises a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or a different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt %, such as at least about 40 wt %, such as at least about 50 wt %, such as at least about 60 wt %, such as at least about 80 wt %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

For example, the amorphous alloy can have the formula $(Zr, Ti)_a(Ni, Cu, Fe)_b(Be, Al, Si, B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr, Ti)_a(Ni, Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula $(Zr, Ti)_a(Ni, Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula $(Zr)_a(Nb, Ti)_b(Ni, Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One exemplary embodiment of the aforedescribed alloy system is a Zr—Ti—Ni—Cu—Be based amorphous alloy under the trade name Vitreloy™, such as Vitreloy-1 and Vitreloy-101, as fabricated by Liquidmetal Technologies, CA, USA. Some examples of amorphous alloys of the different systems are provided in Table 1.

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One exemplary composition is $Fe_{72}Al_5Ga_2P_{11}C_6B_4$. Another example is $Fe_{72}Al_7Zr_{10}Mo_5W_2B_{15}$. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The aforedescribed amorphous alloy systems can further include additional elements, such as additional transition metal elements, including Nb, Cr, V, and Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

TABLE 1

Exemplary amorphous alloy compositions

| Alloy | Atm % | Atm % | Atm % | Atm % | Atm % | Atm % |
|---|---|---|---|---|---|---|
| 1 | Zr 41.20% | Ti 13.80% | Cu 12.50% | Ni 10.00% | Be 22.50% | |
| 2 | Zr 44.00% | Ti 11.00% | Cu 10.00% | Ni 10.00% | Be 25.00% | |
| 3 | Zr 56.25% | Ti 11.25% | Cu 6.88% | Ni 5.63% | Nb 7.50% | Be 12.50% |
| 4 | Zr 64.75% | Ti 5.60% | Cu 14.90% | Ni 11.15% | Al 2.60% | Be 1.00% |
| 5 | Zr 52.50% | Ti 5.00% | Cu 17.90% | Ni 14.60% | Al 10.00% | |
| 6 | Zr 57.00% | Nb 5.00% | Cu 15.40% | Ni 12.60% | Al 10.00% | |
| 7 | Zr 50.75% | Cu 36.23% | Ni 4.03% | Al 9.00% | Sn 0.50% | |
| 8 | Zr 46.75% | Ti 8.25% | Cu 7.50% | Ni 10.00% | Be 27.50% | |
| 9 | Zr 21.67% | Ti 43.33% | Ni 7.50% | Be 27.50% | | |
| 10 | Zr 35.00% | Ti 30.00% | Cu 7.50% | Be 27.50% | | |
| 11 | Zr 35.00% | Ti 30.00% | Co 6.00% | Be 29.00% | | |
| 12 | Au 49.00% | Ag 5.50% | Pd 2.30% | Cu 26.90% | Si 16.30% | |
| 13 | Au 50.90% | Ag 3.00% | Pd 2.30% | Cu 27.80% | Si 16.00% | |
| 14 | Pt 57.50% | Cu 14.70% | Ni 5.30% | P 22.50% | | |
| 15 | Zr 36.60% | Ti 31.40% | Nb 7.00% | Cu 5.90% | Be 19.10% | |
| 16 | Zr 38.30% | Ti 32.90% | Nb 7.30% | Cu 6.20% | Be 15.30% | |
| 17 | Zr 39.60% | Ti 33.90% | Nb 7.60% | Cu 6.40% | Be 12.50% | |
| 18 | Cu 47.00% | Ti 34.00% | Zr 11.00% | Ni 8.00% | | |
| 19 | Zr 55.00% | Co 25.00% | Al 20.00% | | | |

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the amorphous alloy (with only a small incidental amount of impurities). In another embodiment, the composition includes the amorphous alloy (with no observable trace of impurities).

In one embodiment, the final parts exceeded the critical casting thickness of the bulk solidifying amorphous alloys.

In embodiments herein, the existence of a supercooled liquid region in which the bulk-solidifying amorphous alloy can exist as a high viscous liquid allows for superplastic forming. Large plastic deformations can be obtained. The ability to undergo large plastic deformation in the supercooled liquid region is used for the forming and/or cutting process. As oppose to solids, the liquid bulk solidifying alloy deforms locally which drastically lowers the required energy for cutting and forming. The ease of cutting and forming depends on the temperature of the alloy, the mold, and the cutting tool. As higher is the temperature, the lower is the viscosity, and consequently easier is the cutting and forming.

Embodiments herein can utilize a thermoplastic-forming process with amorphous alloys carried out between Tg and Tx, for example. Herein, Tx and Tg are determined from standard DSC measurements at typical heating rates (e.g. 20° C./min) as the onset of crystallization temperature and the onset of glass transition temperature.

The amorphous alloy components can have the critical casting thickness and the final part can have thickness that is thicker than the critical casting thickness. Moreover, the time and temperature of the heating and shaping operation is selected such that the elastic strain limit of the amorphous alloy could be substantially preserved to be not less than 1.0%, and preferably not being less than 1.5%. In the context of the embodiments herein, temperatures around glass transition means the forming temperatures can be below glass transition, at or around glass transition, and above glass transition temperature, but preferably at temperatures below the crystallization temperature $T_X$. The cooling step is carried out at rates similar to the heating rates at the heating step, and preferably at rates greater than the heating rates at the heating step. The cooling step is also achieved preferably while the forming and shaping loads are still maintained.

Electronic Devices

The embodiments herein can be valuable in the fabrication of electronic devices using a BMG. An electronic device herein can refer to any electronic device known in the art. For example, it can be a telephone, such as a cell phone, and a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including a portable DVD player, conventional DVD player, Blu-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

The methods, techniques, and devices illustrated herein are not intended to be limited to the illustrated embodiments.

As disclosed herein, an apparatus or a system (or a device or a machine) is configured to perform melting of and injection molding of material(s) (such as amorphous alloys). The apparatus is configured to process such materials or alloys by melting at higher melting temperatures before injecting the molten material into a mold for molding. As further described below, parts of the apparatus are positioned in-line with each other. In accordance with some embodiments, parts of the apparatus (or access thereto) are aligned on a horizontal axis.

The following embodiments are for illustrative purposes only and are not meant to be limiting.

Figure 3:
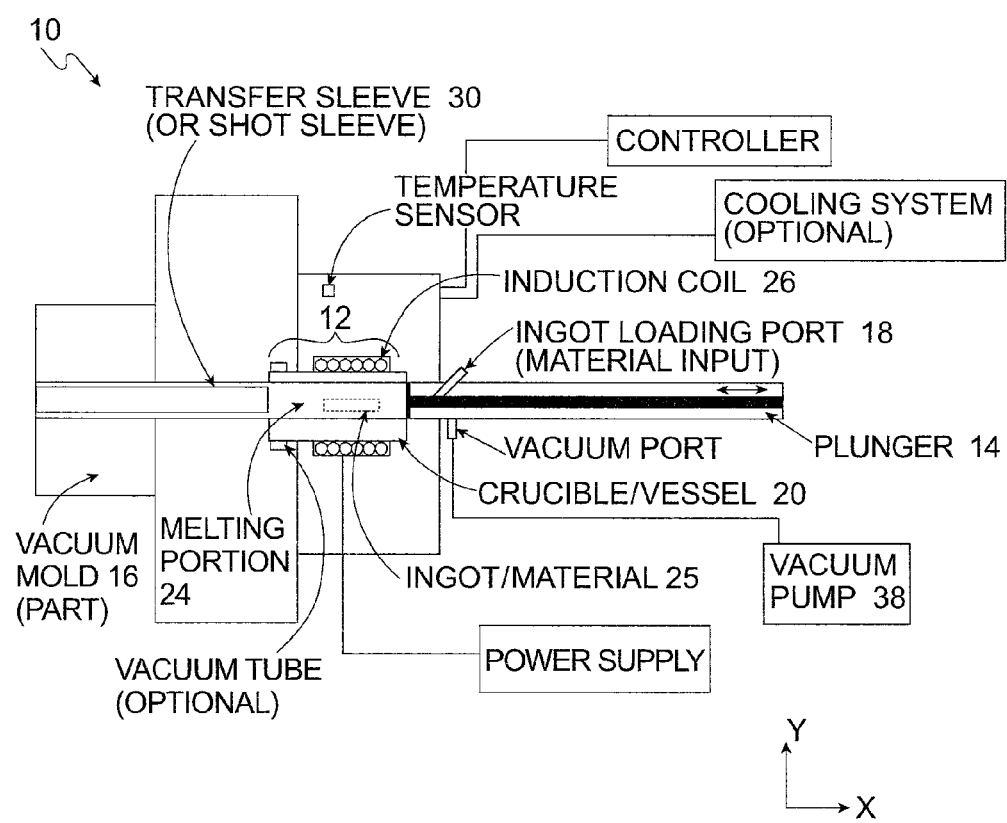
FIG. 3 illustrates a schematic diagram of an exemplary system for using a vessel such as disclosed herein.

FIG. 3 illustrates a schematic diagram of such an exemplary system. More specifically, FIG. 3 illustrates an injection molding apparatus or system 10. In accordance with an embodiment, injection molding system 10 has a melt zone 12 configured to melt meltable material received therein, and at least one plunger rod 14 configured to eject molten material from melt zone 12 and into a mold 16. In an embodiment, at least plunger rod 14 and melt zone 12 are provided in-line and on a horizontal axis (e.g., X axis), such that plunger rod 14 is moved in a horizontal direction (e.g., along the X-axis) substantially through melt zone 12 to move the molten material into mold 16. The mold can be positioned adjacent to the melt zone.

The material to be melted, or "meltable material", can be received in the melt zone in any number of forms. For example, the meltable material may be provided into melt zone 12 in the form of an ingot (solid state), a semi-solid state, a slurry that is preheated, powder, pellets, etc. For explanatory purposes only, throughout this disclosure meltable material is described and illustrated as being in the form of an ingot 25 that is in the form of a solid state feedstock; however, it should be noted that the material to be melted may be received in the injection molding system or apparatus 10 in a solid state, a semi-solid state, a slurry that is preheated, powder, pellets, etc., and that the form of the material is not limiting. In some embodiments, a loading port (such as the illustrated example of an ingot loading port 18) may be provided as part of injection molding system 10. Loading port 18 can be a separate opening or area that is provided within the machine at any number of places. In an embodiment, loading port 18 may be a pathway through one or more parts of the machine. For example, the material (e.g., ingot) may be inserted in a horizontal direction into vessel 20 by plunger 14, or may be inserted in a horizontal direction from the mold side of the injection system 10 (e.g., through mold 16 and/or through a transfer sleeve 30 into vessel 20). In other embodiments, the meltable material can be provided into melt zone 12 in other manners and/or using other devices (e.g., through an opposite end of the injection system).

Melt zone 12 includes a melting mechanism configured to receive meltable material and to hold the material as it is heated to a molten state. The melting mechanism may be in the form of a vessel 20, for example, that has a body for receiving meltable material and configured to melt the material therein. A vessel as used throughout this disclosure is a container made of a material employed for heating substances to high temperatures. For example, in an embodiment, the vessel may be a crucible, such as a boat style crucible. In an embodiment, vessel 20 is a cold hearth melting device that is configured to be utilized for meltable material(s) while under a vacuum (e.g., applied by a vacuum device 38 or pump). In some embodiments, the vessel is a temperature regulated vessel. Vessel 20 may also have an inlet for inputting material (e.g., feedstock) into a receiving or melting portion 24 of its body. In some embodiments, the body of vessel 20 comprises a substantially U-shaped structure. However, this illustrated shape is not meant to be limiting. Vessel 20 can comprise any number of shapes or configurations. The body of the vessel has a length and can extend in a longitudinal and horizontal direction, such that molten material is removed horizontally therefrom using plunger 14. The material for heating or melting may be received in a melting portion 24 of the vessel. Melting portion 24 is configured to receive meltable material to be melted therein. For example, melting portion 24 has a surface for receiving material. Vessel 20 may receive material (e.g., in the form of an ingot) in its melting portion 24 using one or more devices of an injection system for delivery (e.g., loading port and plunger). Further description regarding embodiments of vessels for employment in system 10 is provided below with reference to FIGS. 4-9.

The body of vessel 20 may be configured to receive the plunger rod therethrough in a horizontal direction to move the molten material. That is, in an embodiment, the melting mechanism is on the same axis as the plunger rod, and the body can be configured and/or sized to receive at least part of the plunger rod. Thus, plunger rod 14 can be configured to move molten material (after heating/melting) from the vessel by moving substantially through vessel 20, and into mold 16. Referencing the illustrated embodiment of system 10 in FIG. 3, for example, plunger rod 14 would move in a horizontal direction from the right towards the left, through vessel 20, moving and pushing the molten material towards and into mold 16.

To heat melt zone 12 and melt the meltable material received in vessel 20, injection system 10 also includes a heat source that is used to heat and melt the meltable material At least melting portion 24 of the vessel, if not substantially the entire body itself, is configured to be heated such that the material received therein is melted. Heating is accomplished using, for example, an induction source 26 positioned within melt zone 12 that is configured to melt the meltable material. In an embodiment, induction source 26 is positioned adjacent vessel 20. For example, induction source 26 may be in the form of a coil positioned in a helical pattern substantially around a length of the vessel body (see also FIGS. 4-6). In another embodiment, the induction source 26 is in the form of a coil and embedded in the body of the vessel 20 (see description for FIGS. 7-9). Accordingly, vessel 20 may be configured to inductively melt a meltable material (e.g., an inserted ingot) within melting portion 24 by supplying power to induction source/coil 26, using a power supply or source. Thus, the melt zone 12 can include an induction zone. Induction coil 26 is configured to heat up and melt any material that is contained by vessel 20 without melting and wetting vessel 20. Induction coil 26 emits radiofrequency (RF) waves towards melting portion 24 (and towards vessel 20 in the configuration shown in FIGS. 4-6). The body of vessel 20 and coil 26 may be configured to be positioned longitudinally in a horizontal direction along a horizontal axis (e.g., X axis).

Figure 4:
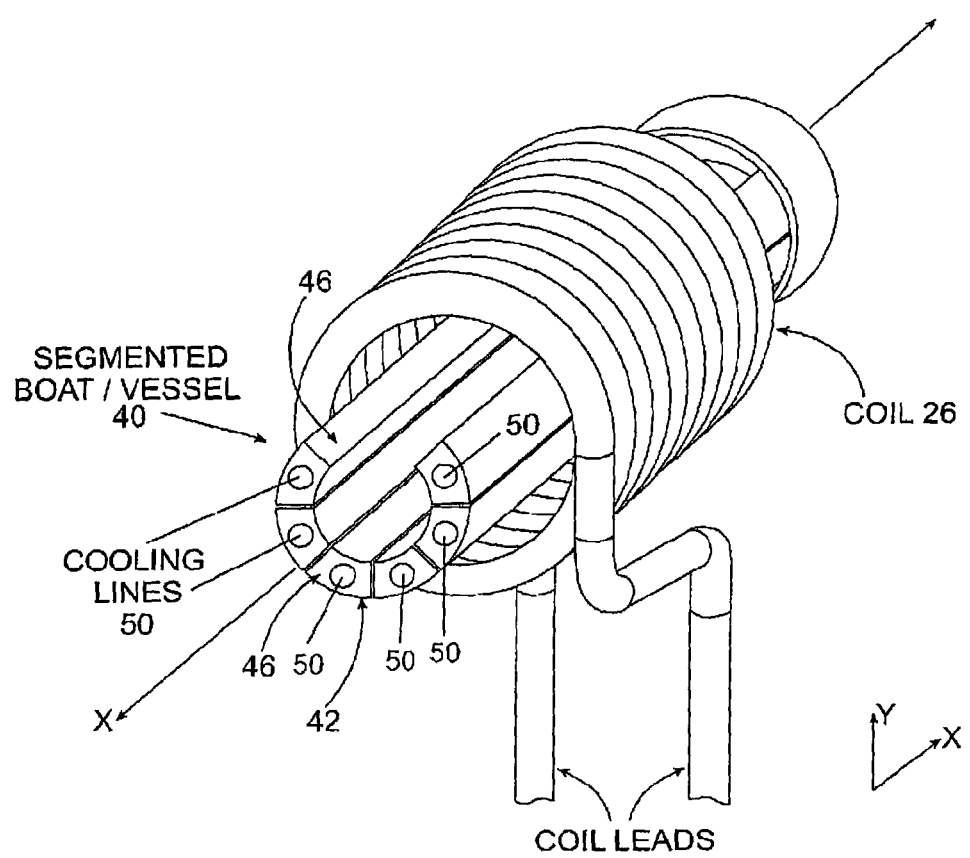
FIG. 4 illustrates a schematic plan view of a vessel with a surrounding induction coil in accordance with an embodiment of this disclosure.
Figure 5:
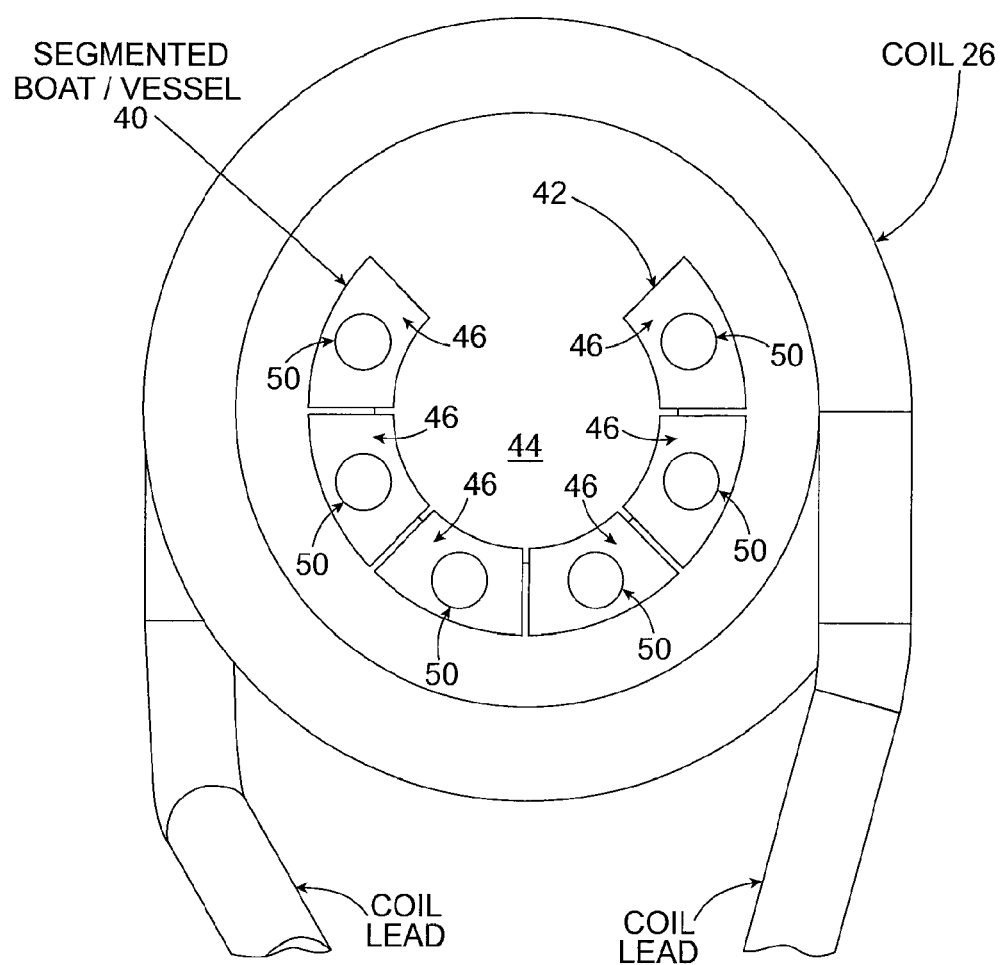
FIG. 5 illustrates an end view of the vessel and coil configuration of FIG. 4.
Figure 6:
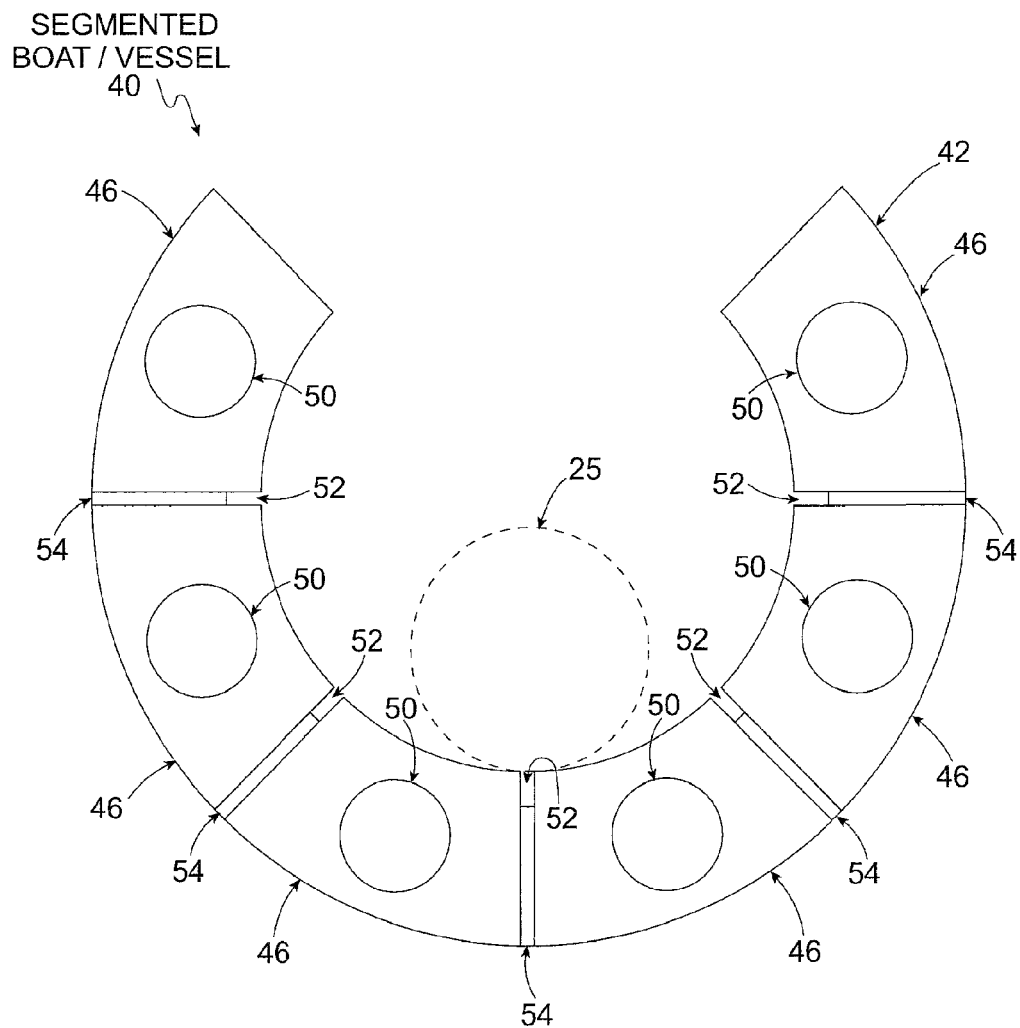
FIG. 6 illustrates a detailed end view showing the ends of segments and material therebetween of the vessel of FIG. 4.

In one embodiment, the vessel 20 is a temperature regulated vessel. Such a vessel may include one or more temperature regulating lines configured to flow a liquid (e.g., water, or other fluid) therein for regulating a temperature of the body of vessel 20 during melting of material received in the vessel (e.g., to force cool the vessel). Such a forced-cool crucible can also be provided on the same axis as the plunger rod. The cooling line(s) can assist in preventing excessive heating and melting of the body of the vessel 20 itself. Cooling line(s) may be connected to a cooling system configured to induce flow of a liquid in the vessel. The cooling line(s) may include one or more inlets and outlets for the liquid or fluid to flow therethrough. The inlets and outlets of the cooling lines may be configured in any number of ways and are not meant to be limited. For example, cooling line(s) may be positioned relative to melting portion 24 such that material thereon is melted and the vessel temperature is regulated (i.e., heat is absorbed, and the vessel is cooled). The number, positioning and/or direction of the cooling line(s) should not be limited. The embodiment of FIGS. 4-6 shows examples of using cooling line(s) 48 within the body of a vessel. The cooling liquid or fluid may be configured to flow through the cooling line(s) during melting of the meltable material, when induction source 26 is powered.

After the material is melted in the vessel 20, plunger 14 may be used to force the molten material from the vessel 20 and into a mold 16 for molding into an object, a part or a piece. In instances wherein the meltable material is an alloy, such as an amorphous alloy, the mold 16 is configured to form a molded bulk amorphous alloy object, part, or piece. Mold 16 has an inlet for receiving molten material therethrough. An output of the vessel 20 and an inlet of the mold 16 can be provided in-line and on a horizontal axis such that plunger rod 14 is moved in a horizontal direction through the body of the vessel 20 to eject molten material and into the mold 16 via its inlet.

As previously noted, systems such as injection molding system 10 that are used to mold materials such as metals or alloys may implement a vacuum when forcing molten material into a mold or die cavity. Injection molding system 10 can further includes at least one vacuum source 38 or pump that is configured to apply vacuum pressure to at least melt zone 12 and mold 16. The vacuum pressure may be applied to at least the parts of the injection molding system 10 used to melt, move or transfer, and mold the material therein. For example, the vessel 20, transfer sleeve 30, and plunger rod 14 may all be under vacuum pressure and/or enclosed in a vacuum chamber.

In an embodiment, mold 16 is a vacuum mold that is an enclosed structure configured to regulate vacuum pressure therein when molding materials. For example, in an embodiment, vacuum mold 16 comprises a first plate (also referred to as an "A" mold or "A" plate), a second plate (also referred to as a "B" mold or "B" plate) positioned adjacently (respectively) with respect to each other. The first plate and second plate generally each have a mold cavity associated therewith for molding melted material therebetween. The cavities are configured to mold molten material received therebetween via an injection sleeve or transfer sleeve 30. The mold cavities may include a part cavity for forming and molding a part therein.

Generally, the first plate may be connected to transfer sleeve 30. In accordance with an embodiment, plunger rod 14 is configured to move molten material from vessel 20, through a transfer sleeve 30, and into mold 16. Transfer sleeve 30 (sometimes referred to as a shot sleeve, a cold sleeve or an injection sleeve in the art and herein) may be provided between melt zone 12 and mold 16. Transfer sleeve 30 has an opening that is configured to receive and allow transfer of the molten material therethrough and into mold 16 (using plunger 14). Its opening may be provided in a horizontal direction along the horizontal axis (e.g., X axis). The transfer sleeve need not be a cold chamber. In an embodiment, at least plunger rod 14, vessel 20 (e.g., its receiving or melting portion), and opening of the transfer sleeve 30 are provided in-line and on a horizontal axis, such that plunger rod 14 can be moved in a horizontal direction through vessel 20 in order to move the molten material into (and subsequently through) the opening of transfer sleeve 30.

Molten material is pushed in a horizontal direction through transfer sleeve 30 and into the mold cavity(ies) via the inlet (e.g., in a first plate) and between the first and second plates. During molding of the material, the at least first and second plates are configured to substantially eliminate exposure of the material (e.g., amorphous alloy) therebetween to at least oxygen and nitrogen. Specifically, a vacuum is applied such that atmospheric air is substantially eliminated from within the plates and their cavities. A vacuum pressure is applied to an inside of vacuum mold 16 using at least one vacuum source 38 that is connected via vacuum lines. For example, the vacuum pressure or level on the system can be held between $1 \times 10^{-1}$ to $1 \times 10^{-4}$ Torr during the melting and subsequent molding cycle. In another embodiment, the vacuum level is maintained between $1 \times 10^{-2}$ to about $1 \times 10^{-4}$ Torr during the melting and molding process. Of course, other pressure levels or ranges may be used, such as $1 \times 10^{-9}$ Torr to about $1 \times 10^{-3}$ Torr, and/or $1 \times 10^{-3}$ Torr to about 0.1 Torr. An ejector mechanism (not shown) is configured to eject molded (amorphous alloy) material (or the molded part) from the mold cavity between the first and second plates of mold 16. The ejection mechanism is associated with or connected to an actuation mechanism (not shown) that is configured to be actuated in order to eject the molded material or part (e.g., after first and second parts and are moved horizontally and relatively away from each other, after vacuum pressure between at least the plates is released).

Any number or types of molds may be employed in the apparatus 10. For example, any number of plates may be provided between and/or adjacent the first and second plates to form the mold. Molds known as "A" series, "B" series, and/or "X" series molds, for example, may be implemented in injection molding system/apparatus 10.

Accordingly, the likelihood of uniformly molded and formed parts depends upon the processes performed on the material in the injection molding system 10. Uniform heating of the meltable material and maintenance of temperature of molten material in such an injection molding apparatus 10 assists in forming a uniform molded part. The configuration of the vessel 20 and melt zone 12 can improve and provide such features.

Figure 8:
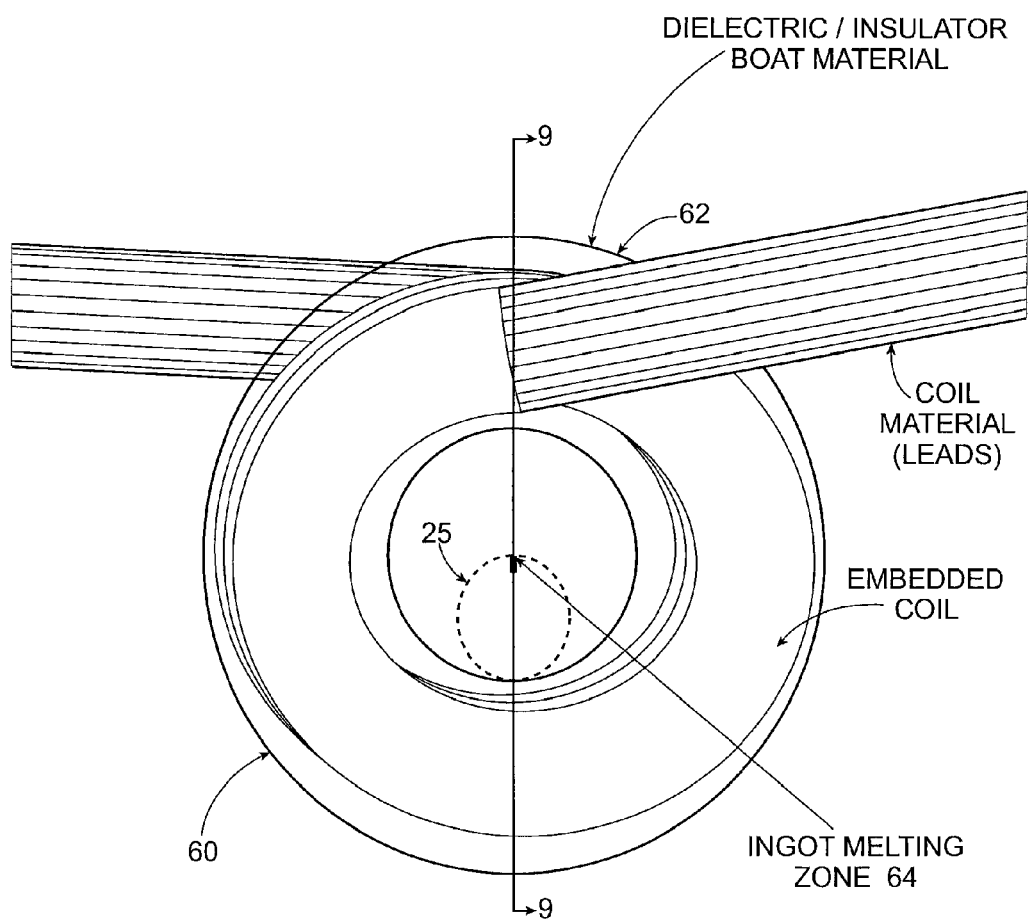
FIG. 8 illustrates an end view of the vessel with coil therein as shown in FIG. 7.

For example, FIG. 4 illustrates an exemplary schematic view of a vessel 40 comprising a body 42 (or base) for meltable material to be melted therein. Vessel 40 is a cold hearth melting device that is configured to be utilized for meltable material(s) while under a vacuum (e.g., applied by vacuum device 38). Body 42 has a melting portion 44 or area (like melting portion 24) configured to receive meltable material to be melted therein (e.g., via a loading port, as shown in FIG. 8). Melting portion 44 is configured to receive meltable material to be melted therein. For example, melting portion 44 has a surface for receiving material. Heating is accomplished using an induction coil 26 positioned adjacent the body 42 in a helical pattern substantially around a length of the body 42 of vessel 40. Accordingly, vessel 40 is configured to inductively melt a material, such as a metal or alloy, within the melting portion 44 by supplying power to induction coil 26.

As shown, the body 42 and coil 26 surrounding vessel 40 are configured to be positioned in a horizontal direction. For example, vessel 40 may be configured to be used in an injection molding system that is positioned to melt and move material in a horizontal (and longitudinal) direction.

In a preferred embodiment, the segments 46 are provided in a different plane than the turns of the induction coil 26, e.g., the longitudinal direction of the segments 46 is substantially perpendicular to the turns of the coil. In another embodiment, the fingers are in the same plane as the turns of the coil.

In an embodiment, the body 42 of the vessel 40 comprises a substantially U-shaped structure. That is, the segments 46 are configured and positioned such that the body has a base with side walls extending therefrom. In an embodiment, each of the segments may comprise substantially rounded and/or smooth surfaces. For example, the surface of the melting portion 44 may be formed in an arc shape (as shown in FIG. 5, for example) by forming each of the segments with top and bottom curved surfaces. However, the shape and/or surfaces of the body are not meant to be limiting.

Body 42 of vessel 40 is formed from a plurality of elongate segments 46 or fingers that are configured to be electrically isolated from each other. As shown in greater detail in FIGS. 5 and 6, the segments 46 are spaced from each other such that adjacent segments have a gap therebetween. In each gap there is provided an insulating material 54. The insulating material electrically isolates the segments 46 from each other, such that when they are used for melting (when coil is heated), any currents are generated in each segment separately. The net result is that the overall power absorbed by the vessel 40 is decreased. Accordingly, the efficiency of vessel 40 is increased.

In accordance with an embodiment, a layer of insulating material 54 is applied to one or more surfaces of vessel 10 to implement such improvements. In an embodiment, the material 54 may be applied in the form of a layer between segments 46. However, it should be understood that the material 54 need not be consistent, fully covering, or of a particular thickness or dimension, or that an entire surface is covered from end to end. In fact, the amount of insulting material 54 provided between segments 46 can vary. In an embodiment, as shown in greater detail in FIG. 6, the insulating material 54 can be applied such that indentations 52 are formed on the surface(s) for receiving the meltable material. Indentations are defined as spaces in a surface of a structure configured to reduce surface contact therewith. The indentations in vessel 40 reduce contact between at least the meltable material and surface of the melting portion 44, which in turn reduces heat loss and transfer. The number and location of indentations 52 may be predefined or random. For example, the number of indentations can depend on either the number of segments 46 or the number of gaps in which insulating material 54 is limited (i.e., not all of the gaps between adjacent segments need to have an indentation; rather, some may include a complete layer therebetween). The indentations on the surface(s) of the vessel extend along and within a surface of at least melting portion 44. The indentations may be parallel to each other along an entire length thereof. In another embodiment, the material 54 may be applied randomly along the length of each segment 46.

Referring back to FIG. 6, each indentation 52 extends into the body 42 (e.g. towards an external surface). The size and dimensions of indentations 52 are not meant to be limiting. In an embodiment, indentations 52 comprise a width and a depth. For example, the width may be the size of an opening in a lateral direction (e.g., perpendicular to a longitudinal direction of the vessel 40). In an embodiment, indentations may also comprise a length (e.g., relative to a longitudinal direction of the vessel 40). The dimensions of the indentations 52 may change according to the size of the gap between adjacent segments. In an embodiment, a number of indentations of different depths may be provided on surface of melting portion 44 of vessel 40. In yet another embodiment, indentations 52 may comprise more than one depth or dimension. For example, indentations 52 may comprise a stepped configuration such that a portion of the indentations extends a distance further into the body. As another example, rows (or trenches) of indentations may be provided at different depths along the surface of the vessel based on the application of insulating material 54 between the segments 46.

In an embodiment, width or diameter D of indentations 52 is about 0.01 mm to about 1.5 mm. In another embodiment, width or diameter D of indentations 52 is about 0.01 mm to about 1.0 mm. In an embodiment, depth or height H of indentations 52 is about 0.01 mm to about 4.0 mm. In another embodiment, depth or height H of indentations 52 is about 0.1 mm to about 2.0 mm. Such dimensions are exemplary and are not limiting.

Also, the thickness of insulating material 54 as it is applied to one or more areas of the vessel 40 should not be limiting. In an embodiment, the thickness of material 54 can vary according to the location for placement of the material 54, for example.

Any number and/or types of methods may be used for applying insulating material 54 to segments 46 of vessel 40 and should not be limiting. For example, the material 54 may be applied as a coating in some embodiments. Additionally or alternatively, techniques such as spray coating, laminating, shielding, dipping, thermal, flame, or plasma spraying, plating, chemical vapor deposition, physical vapor deposition processes and/or other thermal or chemical processes may be used to add material 54 to segments 46. The process used for applying material to any of the herein described surfaces or areas of the vessel should also not be limited to including consistent and/or even coverage.

In accordance with another embodiment, insulating material 54 may be applied as a jacket to surrounds all of the segments 46. Thus, each of the segments 46 can have an insulative coating on its sides, top, and bottom.

In an embodiment, if material 54 (such as ceramic) that has thermal insulating properties is provided over surface(s) of the body 42, the materials used to form the body 42 (or segments 46 and/or material 54) are not restricted. For example, segments 46 of a vessel 40 may be formed of a material that may be RF sensitive, e.g., if the segments 46 are covered in a thermally insulating material such as material 54, the sensitivity of the body 42 may be substantially reduced. Also, harder but more wear resistant alloys (e.g., beryllium copper) with lower conductivity may also be used and coated with material 54, with an increase in power consumption.

Insulating material 54 may be formed from one or more materials, or a combination of materials. In embodiments, material 54 is a poor thermal conductor material, i.e., a material with low thermal conductivity. For example, in an embodiment, the material 54 may be a material that is capable of transferring heat at a rate of less than one-third of that of the material used to form the body/segments. In one embodiment, material 54 is a magnetic material. In another embodiment, material 54 is non-magnetic.

In an embodiment, material 54 may comprise at least one of the following group: ceramic, quartz, stainless steel, titanium, chrome, copper, silver, gold, diamond-like carbon, yttria, yttria oxide, and zirconia. Ceramic, for example, is non conductive to RF power (i.e., from induction coil 26), which means that RF power does not heat or change the temperature of ceramic materials. Using poor thermal conducting materials such as the material 54 between/on segments 46 of vessel 40 will actively regulate the temperature of molten material and the vessel. In an embodiment, the ceramic may comprise an oxide, a nitride, an oxynitride, a carbide, or combinations thereof. In another embodiment, ceramic comprises yttria, silicon nitride, silicon oxynitride, silicon carbide, or combinations thereof. In yet another embodiment, material 54 may be yttrium oxide.

In embodiments, the insulating material used in the vessel can be of low or high thermal conductivity, depending on the configuration of the coil, the location of the insulating material, and/or the alloy being processed by the device (e.g., embodiments like those described below in FIGS. 7-13 may use different insulators).

In accordance with an embodiment, vessel 40 also has one or more temperature regulating lines 50 within its body 42 configured to allow for a flow of a liquid (e.g., water, or other fluid) therein for assisting in regulating a temperature of the body 42 during melting of meltable material received in the melting portion 44. The cooling line(s) 50 assist in preventing excessive heating and melting of the body 42 of the vessel 40 itself. The cooling line(s) 50 may include one or more inlets and outlets for the liquid or fluid to flow therethrough. As described below, the inlets and outlets of the cooling lines may be configured in any number of ways and are not meant to be limited. Cooling line(s) 50 are configured to be positioned within the body 42 relative to the melting portion 44. Cooling line(s) 50 may be positioned relative to melting portion 44 such that material on surface is melted and the vessel temperature is regulated (i.e., heat is absorbed, and the vessel is cooled). For example, for a boat or crucible type vessel that comprises a length and extends in a longitudinal direction, its melting portion 44 may also extend in a longitudinal direction. In accordance with an embodiment, cooling line(s) 50 may be positioned in a longitudinal direction relative to melting portion 44. For example, the cooling line(s) 50 may be positioned at least in a base of the body 42 (e.g., in segments that are underneath or on the bottom). In another embodiment, the cooling line(s) 50 may be positioned in a horizontal or lateral direction.

In another embodiment, each of the elongate segments 46 may include at least one temperature regulating line 50 configured to flow a liquid therethrough for regulating a temperature of the individual segment during melting. In yet another embodiment, cooling line(s) 50 may be configured to cool the segments 46 as a whole. For example, rather than run a cooling line 50 through each finger, cooling lines may be provided around the vessel body 42. In one embodiment wherein insulating material 54 is provided around multiple sides of the segments 46, the cooling line(s) 50 may be provided within the insulating material 54.

The number, positioning and/or direction of the cooling line(s) 50 should not be limited. Cooling line(s) 50 may be provided within the base and/or any of the walls of the body 42 in any number of positions or directions. Also, the size (e.g., diameter or width) of the cooling lines is not limited. The size of the lines may be based on the number of cooling lines included in the body, for example, or the size of the segment or material it is included in. The size may also be based on the thickness and/or amount of desired cooling.

The inlets and outlets of the cooling lines of the vessel may be configured any number of ways. For example, in an embodiment, the cooling liquid may configured to enter and exit each cooling line(s) such that the liquid flows in one direction. In another embodiment, the liquid may be configured to flow in alternate directions, e.g., each adjacent line may include an alternating entrance and exit. In addition, the cooling lines may be configured to have one or more entrances/exits that are configured to allow flow of the liquid between the cooling lines. For example, in an embodiment wherein a vessel comprises longitudinally extending cooling lines, one or more of the cooling lines may include one or more lateral or extending line(s) that extend to another line(s) such that they are fluidly joined to each other. That is, the liquid is configured to not only run longitudinally along the body, but also through and between connected lines.

Accordingly, the above described embodiments assist in reducing the amount of power absorbed by the vessel, and therefore have more power to put into the material that is being melted. More power allows the system to achieve higher melt temperatures. However, it should be noted that this does not necessarily mean that more power needs to be applied to the induction coil 26. Rather, this improves the melting process by allowing a lower application of power, since a higher melt temperature can be achieved when utilizing the herein disclosed vessels (such as vessel 40).

Additionally, it is noted that rendering meltable materials such as alloys to a molten state can be achieved by sending large amounts of current through a conductive coil, such as coil 26. This produces a localized oscillating electromagnetic field. The localized electromagnetic field dissipates energy (heat) in the material/alloy by the alloy's resistance to eddy current propagation. A side effect of using this technique is that the coil material itself (coil 26) becomes hot due to resistive heating effects from the current being forced through the coil.

Figure 14:
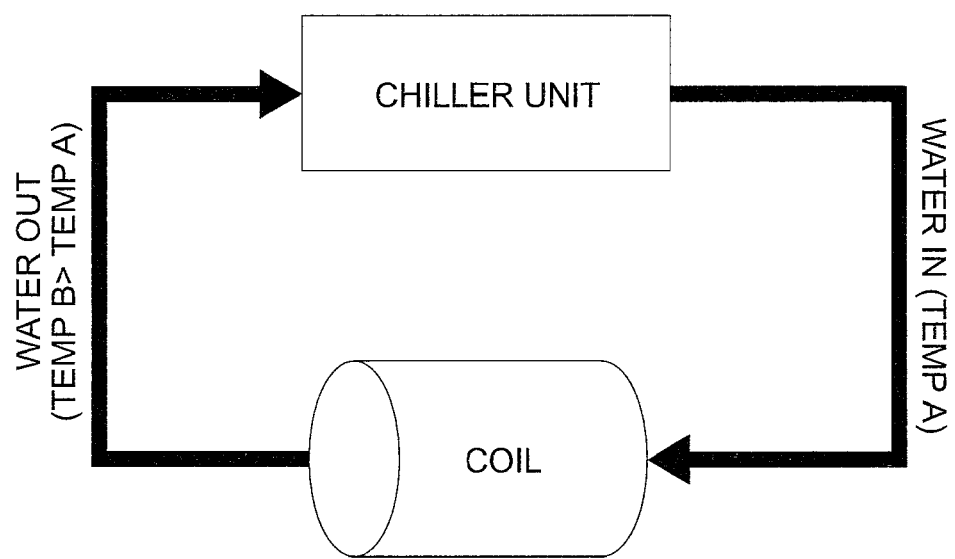
FIG. 14 illustrates a schematic diagram of a cooling system used to cool an induction coil during use.

In applications where resistive heating of the coil is significant enough to soften or melt the coil material, some form of coil cooling should be employed. Thus, in addition or alternatively to cooling lines of the vessel, the induction coil(s) as disclosed in the embodiments herein may be configured to be associated a cooling system or cooling lines. That is, the same or a separate cooling system may be used to cool the induction coil during heating or use of the system. For example, FIG. 14 illustrates a schematic diagram of a cooling system that may be used to cool an induction coil. The "chiller unit" may be a part of the cooling system illustrated in FIG. 3, for example. The chiller unit is configured to provide a cooling material, liquid, fluid, or gas to one or more parts of the system, which may be the induction coil. The cooling can be "active" where a fluid or gas is used to carry the heat away from the coil material. In accordance with an embodiment, the gas or fluid is pumped through the coil which is formed out of a tube, or around part of the coil so that the heat is dissipated along the coil to the points which are actively cooled.

In either case, the cooling fluid or gas is provided at a temperature such that the energy (in the form of heat) is transferred from the coil material to the cooling fluid or gas, and carried downstream or away from the coil where heat energy is removed from the fluid or gas via a chilling unit and returned to the coil (closed loop system), or the liquid or gas is allowed to flow out into atmosphere, ground, holding tank, etc. (open loop system).

A single chiller unit can provide cooling water to many different components of a machine, including, but not limited to, induction coil 26 and/or the vessels as disclosed herein. The chiller unit can have the capability to return the cooling fluid to a fixed temperature before the fluid returns to the coil so that the temperature of the cooling fluid as it enters the coil is known.

The cooling fluid can be selectively activated to run or pump through cooling lines. In some embodiments, the fluid or gas could be pumped through or adjacent the coil only while the coil is activated (i.e., being heated). In some embodiments, the fluid or gas can be configured to be pumped in order to sufficiently keep the coil at a safe operating temperature. For example, the system can be programmed to provide fluid or gas to the cooling lines/system based on sensor readings.

The cooling lines can travel a short (less than a meter) or long (many meters) distance between the chiller unit/system and the coil (or vessel) being cooled. Thus, the chiller unit/system can be located near or adjacent to the injection molding system, within the injection molding system, or a distance away from the injection molding system (e.g., in another room).

Figure 7:
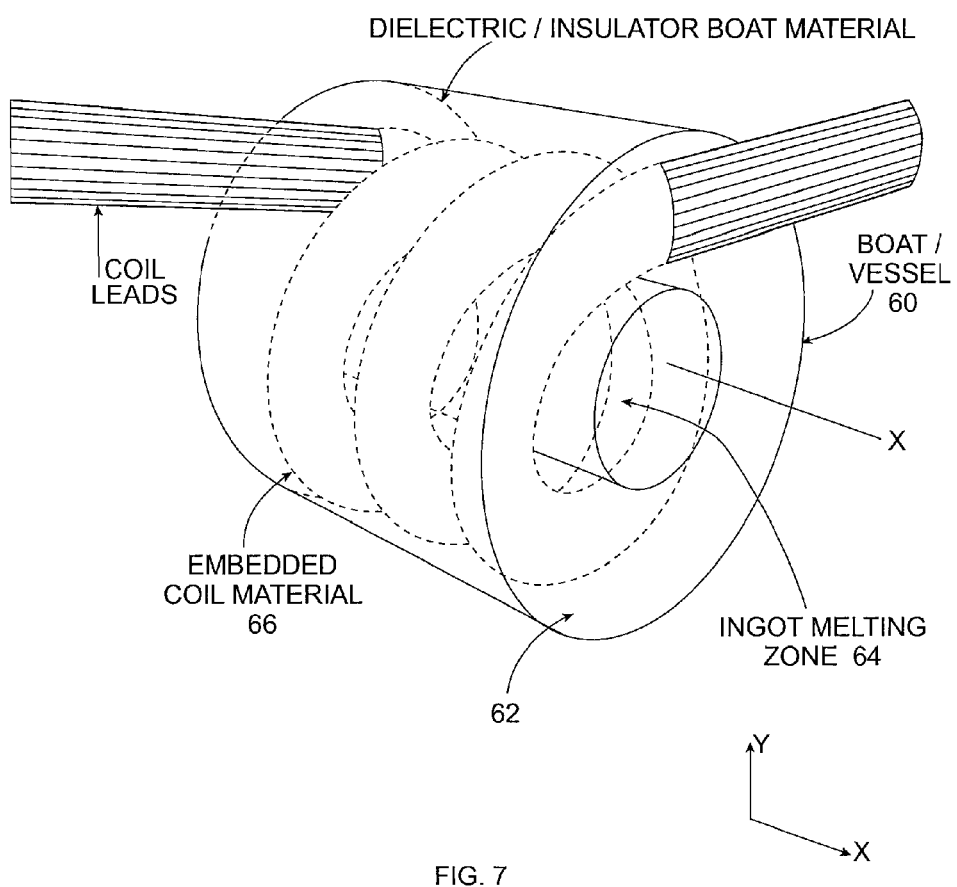
FIG. 7 illustrates a schematic plan view of a vessel with an embedded induction coil in accordance with yet another embodiment.
Figure 9:
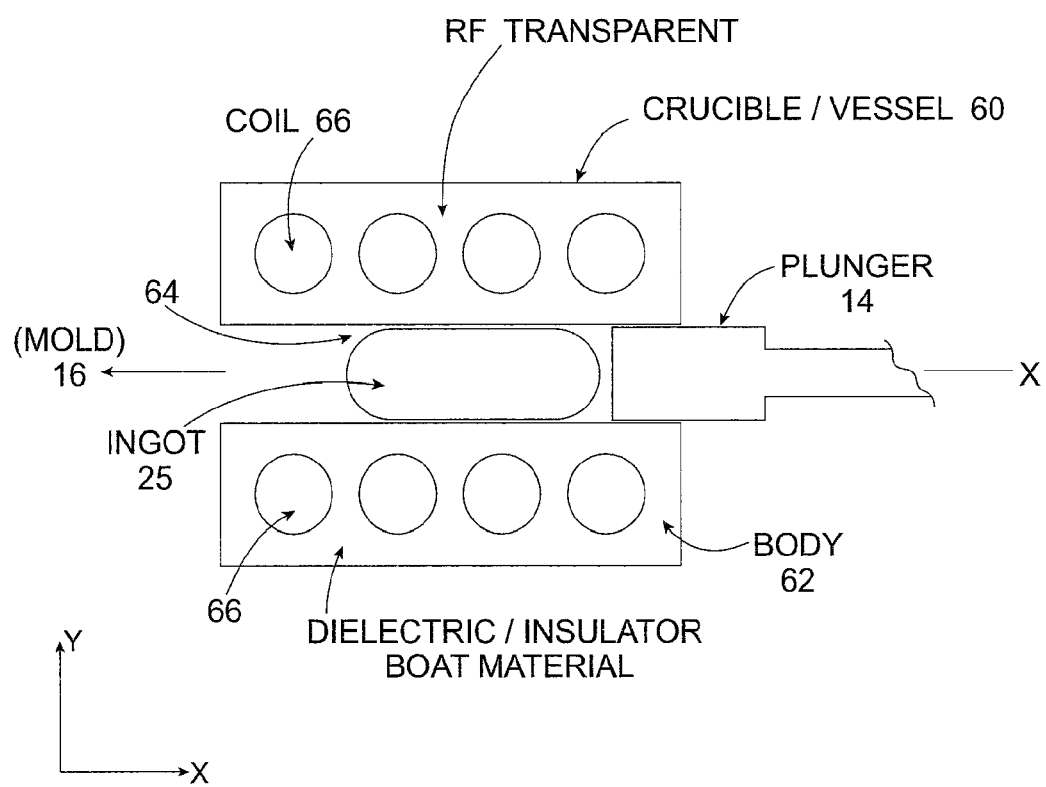
FIG. 9 illustrates a cross sectional view taken along section line 9-9 in FIG. 8 of the vessel, in accordance with an embodiment.

FIGS. 7-9 disclose another embodiment showing a vessel 60 for holding and melting meltable material therein having a body 62 with a melting portion 64 configured to receive meltable material to be melted therein and an induction coil 66 embedded within the body 62. Induction coil 66 is configured to melt the meltable material received in the melting portion 64. In accordance with an embodiment, the embedded induction coil 66 is configured to surround the melting portion 64. Body 62 has a tube-like configuration with an opening extending therethrough to form the melting portion 64. The opening is configured to receive a plunger such as plunger 14 therethrough, so that molten material can be moved from the body in a melt zone and into a mold.

Melting portion 64 has a surface for receiving material. Heating is accomplished using an induction coil 66 embedded and configured in a helical pattern within the body 62 substantially around a length of the melting portion 64. The coil 66 is configured to substantially surround the melting portion 64. Accordingly, the system is configured to inductively melt a material, such as a metal or alloy ingot, within the melting portion 44 by supplying power to induction coil 66. Embedding the coil 66 within the material of body 62 creates a more efficient melting apparatus that is streamlined and positions the coil 66 such that the material to be melted fills the vessel with a larger volume fraction. The higher the volume fraction, the more efficient the heating can be. For example, if the coil is positioned such that it is approximately one millimeter away from an outer diameter of an ingot of amorphous alloy, the efficiency of the heating process would increase.

As shown, the body 62 and coil 66 are configured to be positioned in a horizontal direction. For example, vessel 60 may be configured to be used in an injection molding system 10 that is positioned to melt and move material in a horizontal (and longitudinal) direction. However, in an embodiment, vessel 60 may also be positioned vertically and used in a vertical injection molding system.

The dimensions of the body 62 (e.g., length, diameter, thickness of material with coil embedded therein), the melting portion 64 therein (e.g., diameter), and other parts of vessel 60 may be adjusted according to the size of the melt zone 12 in the system 10 or the parts being melted. The dimensions should not be limited.

In an embodiment, the body 62 of the vessel 60 may be formed from a dielectric or insulator material that is non-conductive, such as a technical ceramic. Use of a technical ceramic will allow the RF or magnetic fields from the coil 66 to pass directly through the body 62 and into the meltable material in the melting portion 64. Accordingly, using a ceramic material will minimize the reaction between the material of body 62 and the meltable material(s) that are being melted. Also, skull formation and degradation of the meltable material can be minimized. In one embodiment, body 62 is formed from a nitrate ceramic, such as cylon.

Figure 10:
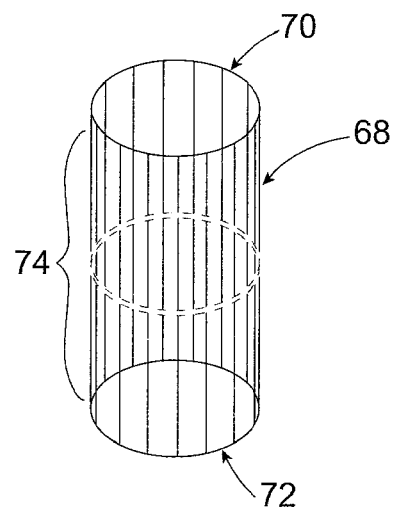
FIG. 10 illustrates an alternate coil configuration for use in a vessel in accordance with another embodiment of this disclosure.

FIG. 10 illustrates an alternate coil configuration for use in a vessel in accordance with another embodiment. For explanatory purposes only, FIG. 10 does not show the body of the vessel or segments. However, it should be understood that the illustrated coil is configured to be embedded into a body of a vessel configured to receive meltable material to be melted therein.

More specifically, FIG. 10 shows an induction coil 68 configured to melt the meltable material received in a melting portion of an associated vessel. In accordance with an embodiment, the embedded induction coil 68 is configured to surround the melting portion of the vessel. Its body (not shown) can have a tube-like configuration with an opening extending therethrough to form the melting portion. The opening is configured to receive a plunger such as plunger 14 therethrough, so that molten material can be moved from the body in a melt zone and into a mold. As shown, the induction coil 68 is provided in a birdcage configuration, comprising loops 70 and 72 configured to be positioned adjacent each end of a body. The loops 70 and 72 are connected to each other via elongate struts 74. The loops and struts are made of conductive material. Each strut has a characteristic capacitance which is tuned such that the coil resonates at a specific frequency (e.g., RF power is dissipated very efficiently by the coil at one particular frequency).

The induction coil 68 is configured to inductively melt a material, such as a metal or alloy ingot, within the melting portion of its associated vessel by supplying power to induction coil 68. Embedding the coil 68 within the material of a body creates a more efficient melting apparatus that is streamlined and positions the coil such that the material to be melted fills the vessel with a larger volume fraction. The higher the volume fraction, the more efficient the heating can be. For example, if the coil is positioned such that it is approximately one millimeter away from an outer diameter of an ingot of amorphous alloy, the efficiency of the heating process would increase.

The induction coil 68 may be provided in vessel that is configured to be positioned longitudinally in a horizontal direction (e.g., along X-axis) or in a vertical direction (e.g., along Y-axis). For example, the vessel may be configured to be used in an injection molding system 10 that is positioned to melt and move material in a horizontal (and longitudinal) direction. However, in an embodiment, the vessel may also be positioned vertically and used in a vertical injection molding system.

The dimensions of the body (e.g., length, diameter, thickness of material with coil embedded therein), the melting portion therein (e.g., diameter), and other parts of vessel associated with induction coil 68 may be adjusted according to the size of the melt zone 12 in the system 10 or the parts being melted. The dimensions should not be limited.

In an embodiment, the vessel in which coil 68 is embedded may be formed from a dielectric or insulator material that is non-conductive, such as a technical ceramic (in a similar way as the helical coil, described in detail above, and therefore not repeated here).

Figure 11:
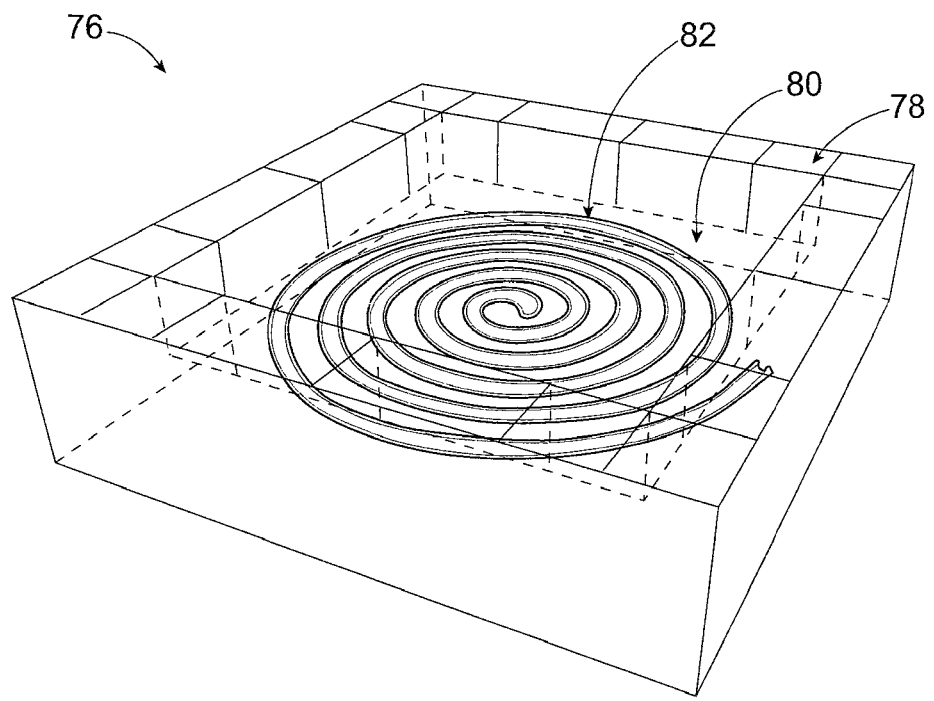
FIG. 11 illustrates an alternate coil configuration and a vessel in accordance with yet another embodiment of this disclosure

FIG. 11 illustrates an alternate coil configuration and a vessel 76 in accordance with yet another embodiment. Vessel 76 is designed for melting meltable material therein and has a body 78 with a melting portion 80 configured to receive meltable material to be melted therein and an induction coil 82 embedded within the body 78, configured to melt the meltable material received in the melting portion 80. In accordance with an embodiment, the embedded induction coil is provided in a spiral configuration. In an embodiment, the embedded induction coil 82 is provided in a pancake configuration. That is, the coil 82 is provided in a spiral configuration in a single plane (such that the adjacent rounds of coil are substantially flat), as generally shown in FIG. 11. The coil 82 may be configured to be provided within at least a bottom portion (e.g., below) melting portion 80 of vessel 76. Melting portion 80 comprises a cavity in which meltable material is configured to be placed on a surface therein. The coil does not contact the material. Rather, the localized region above the coil, i.e., the cavity, is where the highest field strengths are generated for heating. Body 78 has walls configured to surround melting portion 80 and contain meltable material in the cavity. In the illustration, the cavity and body 78 are shown of a substantially polygonal (e.g., rectangular or square) configuration. However, it should be understood that the melting portion 80 and walls of the body 78/vessel 76 may be of a circular or round configuration, or some other configuration. The geometry of the body can be adapted to an inline melting system, such that a plunger is configured to move therethrough (and move molten material from the melt zone 12 and into mold 16).

Accordingly, vessel 76 is configured to inductively melt a material, such as a metal or alloy ingot, within the cavity of melting portion 80 by supplying power to induction coil 82. Embedding the coil 82 within the bottom of body 78 creates an efficient melting apparatus by positioning the coil 82 adjacent to the surface in which it is positioned.

The dimensions of the body 78 (e.g., length, diameter, thickness of material with coil embedded therein), the melting portion 80 and cavity, and other parts of vessel 76 may be adjusted according to the size of the melt zone 12 in the system 10 or the parts being melted. The dimensions should not be limited.

In an embodiment, the body 78 of the vessel 76 may be formed from a dielectric or insulator material that is non-conductive, such as a technical ceramic, as described in detail above.

Figure 12:
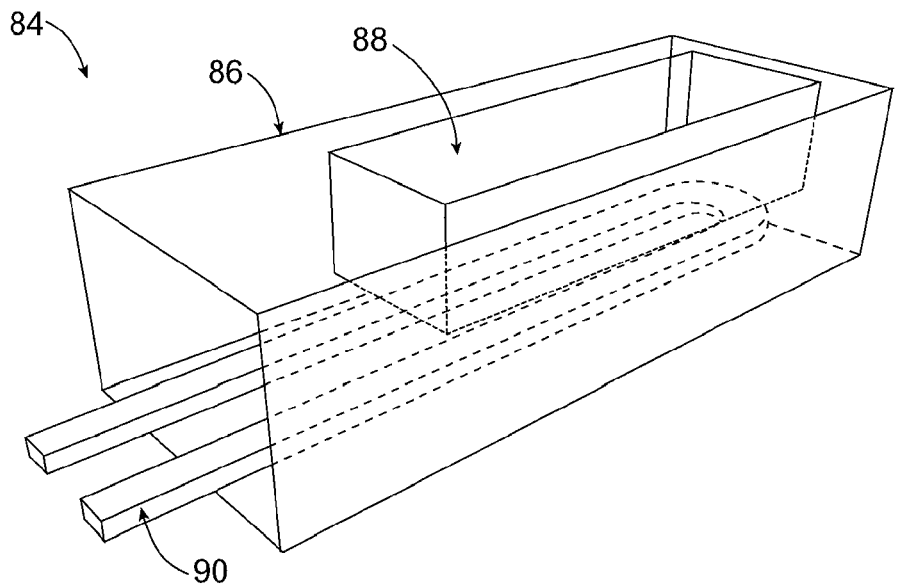
FIGS. 12 and 13 illustrate yet another coil configuration and vessel in accordance with embodiments of this disclosure.
Figure 13:
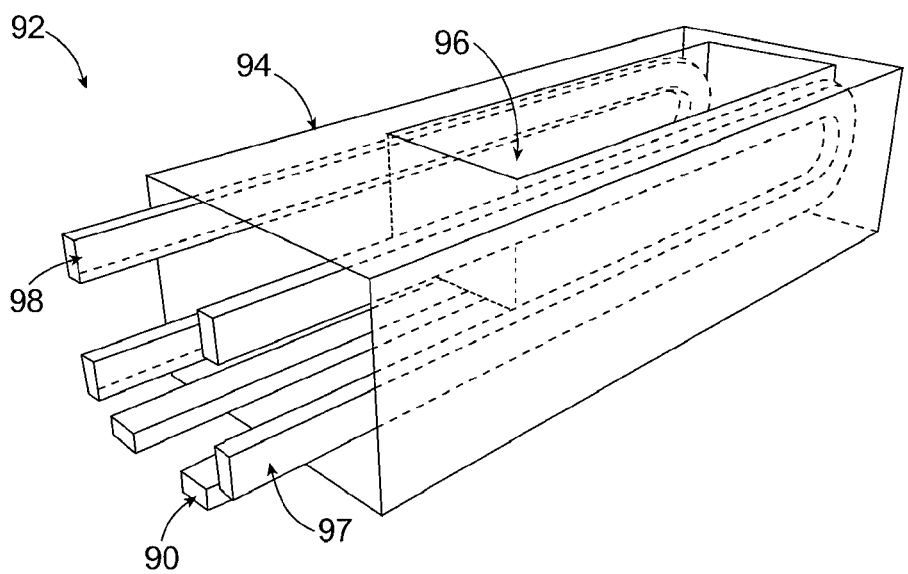

FIGS. 12 and 13 illustrate vessels in accordance with other embodiments of this disclosure. Each of the vessels are configured to include a cavity, compartment, or opening therein for receiving a meltable material (such as an ingot). Although not shown, it should be understood that one or more other openings or paths that are configured to receive a plunger for moving molten material from the vessel and into a mold are also designed and envisioned as being included therein. For example, each of the vessels in FIGS. 12 and 13 may comprise an opening at each that extends through the cavity or compartment, and/or the opening can extend from end-to-end such that the vessel has a substantially U-shaped configuration. However, for explanatory and simplicity purposes only, such paths are not shown.

Referring now to FIG. 12, there is shown a vessel 84 for holding and melting meltable material therein having a body 86 with a melting portion 88 configured to receive meltable material to be melted therein and an induction coil 90 embedded within the body 86. Induction coil 90 is configured to melt the meltable material received in the melting portion 88. In accordance with an embodiment, the embedded induction coil 90 is configured adjacent to melting portion 88. Body 86 has an opening, cavity, or compartment at least extending therein to form the melting portion 88.

Coil 90 comprises a substantially U-shaped configuration, also referred to herein as a "hairpin" configuration. Coil 90 comprises a U-bend of conductive material that is provided in a single plane (such that the sides are substantially flat). Coil 90 may be configured to be provided within at least a bottom portion (e.g., below) melting portion 88 of vessel 84. The region just above the turn is where the highest strength electromagnetic field is generated. Melting portion 88 comprises a cavity in which meltable material is configured to be placed on a surface therein. The coil does not contact the material. Rather, the localized region above the coil, i.e., the cavity, is where the highest field strengths are generated for heating. Body 86 has walls configured to surround melting portion 88 and contain meltable material in the cavity. In the illustration, the cavity and body 86 are shown of a substantially polygonal (e.g., rectangular or square) configuration. However, it should be understood that the melting portion 88 and walls of the body 86/vessel 84 may be of a circular or round configuration, or some other configuration. The geometry of the body can be adapted to an inline melting system, such that a plunger is configured to move therethrough (and move molten material from the melt zone 12 and into mold 16).

Accordingly, vessel 84 is configured to inductively melt a material, such as a metal or alloy ingot, within the cavity of melting portion 88 by supplying power to induction coil 90. Embedding the coil 90 within the bottom of body 86 creates an efficient melting apparatus by positioning the coil 90 adjacent to the surface in which it is positioned.

The dimensions of the body 86 (e.g., length, diameter, thickness of material with coil embedded therein), the melting portion 88 and cavity, and other parts of vessel 84 may be adjusted according to the size of the melt zone 12 in the system 10 or the parts being melted. The dimensions should not be limited.

In an embodiment, the body 86 of the vessel 84 may be formed from a dielectric or insulator material that is non-conductive, such as a technical ceramic, as described in detail above (but not repeated here).

FIG. 13 shows a vessel 92 similar to vessel 84 of FIG. 12, but including a plurality of embedded induction coils therein. That is, vessel 92 includes multiple induction coils that are positioned adjacent to a melting portion 96 in a body 94. The plurality of induction coils may be two or more coils that are positioned and embedded within a body such that the coils are provided on two or more sides of a melting portion (that received meltable material).

Vessel 92, as shown, includes an induction coil like coil 90 that is embedded and provided within a bottom portion (e.g., below) melting portion 96 of vessel 92. Additionally, induction coils 97 and 98 are also embedded within the body 94. In the illustrated configuration of FIG. 13, the induction coils 97 and 98 also comprise a substantially U-shaped structure or hairpin configuration, and are embedded such that they are positioned adjacent to sides of melting portion 96. The coils do not contact the material. The induction coils 90, 97, and 98 are configured to melt the meltable material received in the melting portion 96.

The regions near the turns or bends in each of the coils is where the highest strength electromagnetic field is generated, and thus the coils 90, 97, and 98 are positioned such that most of the RF is provided towards material in melting portion 96. Melting portion 96 comprises a cavity in which meltable material is configured to be placed on a surface therein. Body 94 has walls configured to surround melting portion 96 and contain meltable material in the cavity. In the illustration, the cavity and body 94 are shown of a substantially polygonal (e.g., rectangular or square) configuration. However, it should be understood that the melting portion 96 and walls of the body 94/vessel 92 may be of a circular or round configuration, or some other configuration. The geometry of the body can be adapted to an inline melting system, such that a plunger is configured to move therethrough (and move molten material from the melt zone 12 and into mold 16).

Accordingly, vessel 92 is configured to inductively melt a material, such as a metal or alloy ingot, within the cavity of melting portion 96 by supplying power to induction coils 90, 97, and 98. Embedding the coils 90, 97, and 98 within the multiple positions in the body 94 to surround the melting portion 96 creates a more efficient melting apparatus.

The dimensions of the body 94 (e.g., length, diameter, thickness of material with coil embedded therein), the melting portion 96 and cavity, and other parts of vessel 92 may be adjusted according to the size of the melt zone 12 in the system 10 or the parts being melted. The dimensions should not be limited.

In an embodiment, the body 94 of the vessel 92 may be formed from a dielectric or insulator material that is non-conductive, such as a technical ceramic, as described in detail above (again, not repeated here).

In another embodiment, it is envisioned that spiral or pancake coils may be used and embedded in a similar configuration, such as shown in FIG. 13. That is, spiral or pancake coils may be embedded and positioned to surround a melting portion on at least two or more sides.

In accordance with an embodiment, any of vessels of FIGS. 7-13 can have one or more temperature regulating lines within or adjacent its body that are configured to allow for a flow of a liquid or gas (e.g., water, air, or other fluids or gases) therein for assisting in regulating the temperature of the body during melting of meltable material received in the melting portion. The cooling line(s) assist in preventing excessive heating and melting of the body of the vessel itself. The cooling line(s) may include one or more inlets and outlets for the liquid or fluid to flow therethrough. The inlets and outlets of the cooling lines may be configured in any number of ways and are not meant to be limited. The cooling line(s) are configured to be positioned within the body relative to the melting portion, such that material is melted and the vessel temperature is regulated (i.e., heat is absorbed, and the vessel is cooled). For example, for a boat or crucible type vessel that comprises a length and extends in a longitudinal direction, its melting portion may also extend in a longitudinal direction. In accordance with an embodiment, cooling line(s) may be positioned in a longitudinal direction relative to melting portion (i.e., along an axis parallel to X-axis). For example, the cooling line(s) may be positioned at least in a base of the body. In another embodiment, the cooling line(s) may be positioned in a horizontal or lateral direction. In yet another embodiment, the vessel and/or cooling lines may be positioned in a vertical direction.

The number, positioning and/or direction of the cooling line(s) in any of the vessels of FIGS. 4-13 should not be limited. The cooling line(s) may be provided within the bottom and/or any of the walls of the tube body in any number of positions or directions. Also, the size (e.g., diameter or width) of the cooling lines is not limited.

In another embodiment, the vessels do not have any cooling lines either in the vessel or incorporated in the induction coil itself. In such instances, the induction coil could be solid core conductive metal (e.g., wire), for example. This embodiment would be particular to lower melting temperature alloys. The induction coils could also be of hollow core wire (if active cooling is implemented).

The inlets and outlets of the cooling lines of the vessels described herein may be configured any number of ways. Moreover, the arrangement of the cooling lines/system for the induction coils are also not limiting.

Although materials have been previously mentioned, it should be noted that the bodies of any of vessels described herein may comprise one or more materials, including a combination of materials. The body of either vessel may be formed from any number of materials (e.g., copper, silver) and/or include one or more coatings. For example, the vessel bodies (or segments) may comprise a metal or a combination of metals, such as one selected from the group of: stainless steel (SS), copper, copper beryllium, amcolloy, ceramic, sialon ceramic, yttria, zirconia, chrome, titanium, silver, and stabilized ceramic coating. In embodiments, the bodies of vessels are formed from one or more materials that are RF insensitive (RF transparent). In an embodiment, a combination of RF insensitive (RF transparent) material is used to form the vessel body. For example, the coil can be surrounded or encapsulated in an electrically insulative material such as ceramic or cement. In one embodiment, the material to be melted (e.g., a received second material) is an amorphous alloy.

It should also be noted that, although illustrated in some of the embodiments as such, the coil does not necessarily have to be of a tubular configuration. Rather, in accordance with one or more embodiments, the coil may have a solid core configuration (e.g., where the coil does not require fluid or gas cooling).

The above described embodiments of vessels may be used in any number of manufacturing methods or processes for melting material, such as amorphous alloy. By obtaining a vessel (as shown in any of the Figures), the method for melting can be implemented by inserting material into a loading port (e.g., in the form of an ingot) and such that it is received in a melting portion of the body (e.g., via an insertion port). After material is received by body, the surfaces of the vessel and thus the material can be heated via activating a heat source (induction coil 26) positioned adjacent the vessel. While heating, cooling liquid flows through cooling lines of the vessel 10 (if present) to assist in regulating its temperature (i.e., heat is absorbed, vessel is cooled) such that it is maintained at a substantially consistent temperature. Vacuum pressure may be applied during the method of melting. After material is melted, it can be moved into a mold of the system, for example.

The coil leads or ends as shown in the embodiments are configured to be attached to a power source, so that power can be applied to the coils to melt the material received in vessels.

Accordingly, the herein described implementations of vessels improves overall performance of the device, including but not limited to efficiency, versatility, and potential longer life of the vessel, as well as improves the quality of the resultant molded product or part. The described embodiments of vessels are designed to improve melt and process temperatures and thermal homogeneity in the melt for systems, as well as improve power consumption. Employing such implementations increases control of the temperature of the vessel and molten material. Accordingly, a higher energy efficiency may be achieved.

The aforedescribed vessel or crucible can be used in a fabrication device and/or process including using BMG (or amorphous alloys). Because of the superior properties of BMG, BMG can be made into structural components in a variety of devices and parts. One such type of device is an electronic device, as noted previously.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will be appreciated that many of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. A vessel for melting meltable material comprising:
    a body extending longitudinally in a horizontal direction with a melting portion configured to receive meltable material to be melted therein, the body comprising:
    a plurality of elongate segments arranged to form a melting surface;
    an insulating material between each of the plurality of elongate segments to electrically isolate each segment from an adjacent segment;
    the insulating material spaced a distance from the melting surface to form indentations in the melting surface; and
    the body including a first opening to receive a plunger for horizontally moving the meltable material from the melting portion through a second opening; wherein the body comprises a substantially U-shaped structure.

2. The vessel according to claim 1, wherein the insulating material includes an RF transparent material.

3. The vessel according to claim 2, wherein the RF transparent material is an electrical insulator and of low thermal conductivity.

4. The vessel according to claim 1, wherein the plurality of elongate segments are formed from a stainless steel, copper-based, silver, or titanium material.

5. The vessel according to claim 1, wherein the plurality of elongate elements are configured such that the body has a base with side walls extending vertically.

6. The vessel according to claim 1, wherein the body further comprises one or more temperature regulating lines configured to flow a liquid therein for regulating a temperature of the melting portion during melting.

7. The vessel according to claim 1, wherein each of the elongate segments comprises at least one temperature regulating line configured to flow a liquid therethrough for regulating the temperature of the segment during melting.

8. The vessel according to claim 1, further comprising an induction coil positioned adjacent to the body configured to melt the meltable material received in the melting portion.

9. A vessel for melting meltable material comprising:
    a body extending longitudinally in a horizontal direction with a melting portion configured to receive meltable material to be melted therein;
    the body formed from a plurality of elongate dielectric material segments arranged to form a melting surface in contact with the meltable material to be melted and wherein the body comprises a substantially U-shaped structure;
    an induction coil embedded within the body configured to melt the meltable material received in the melting portion;
    the body including a first opening to receive a plunger for horizontally moving the meltable material from the melting portion through a second opening in the body opposite to the first opening;
    a vacuum mold for receiving the meltable material from the body; and
    at least one vacuum source to apply a vacuum to the vacuum mold and the body.

10. The vessel according to claim 9, wherein the embedded induction coil is configured to surround the melting portion.

11. The vessel according to claim 9, wherein the embedded induction coil is provided in a spiral configuration.

12. The vessel according to claim 9, wherein the embedded induction coil is provided in a pancake configuration within at least a bottom portion of the melting portion.

13. The vessel according to claim 9, wherein the embedded induction coil comprises a substantially U-shaped configuration.

14. The vessel according to claim 9, wherein a plurality of induction coils are embedded within the body adjacent to the melting portion.

15. The vessel according to claim 14, wherein each of the plurality of embedded induction coils comprise a substantially U-shaped configuration.

16. The vessel according to claim 9, wherein the embedded induction coil is provided in a birdcage configuration comprising loops adjacent each end of the body that are connected via elongate struts.

17. The vessel according to claim 9 further including temperature regulating lines within the body.

18. The vessel according to claim 9 further including temperature regulating lines adjacent to the body.

* * * * *